March 23, 1926. 1,578,208
R. B. RICHARDSON
TEMPERATURE REGULATOR OR THERMOSTAT
Filed August 13, 1923 5 Sheets-Sheet 1
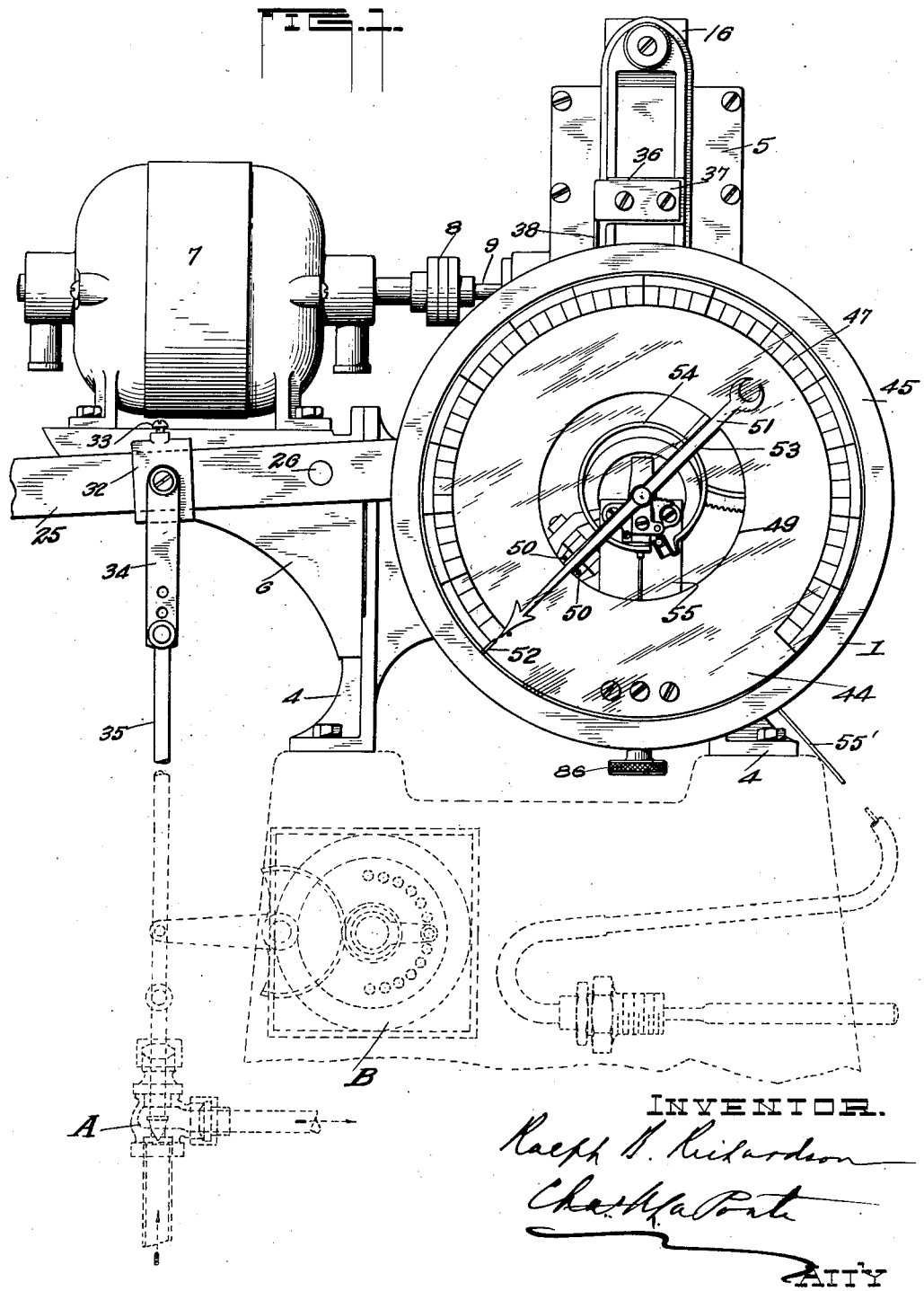

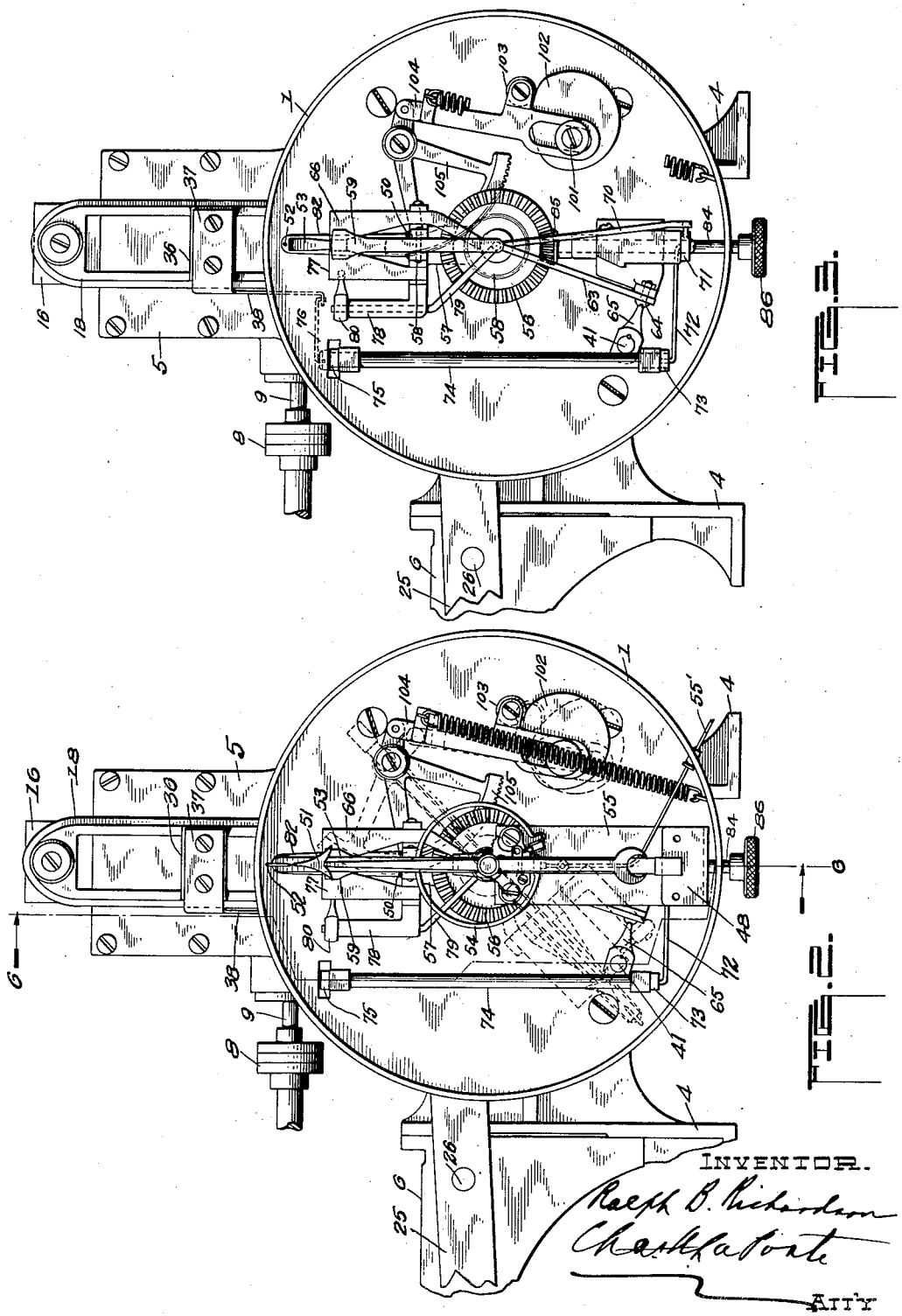

March 23, 1926.  
R. B. RICHARDSON  
1,578,208  
TEMPERATURE REGULATOR OR THERMOSTAT  
Filed August 13, 1923  5 Sheets-Sheet 3
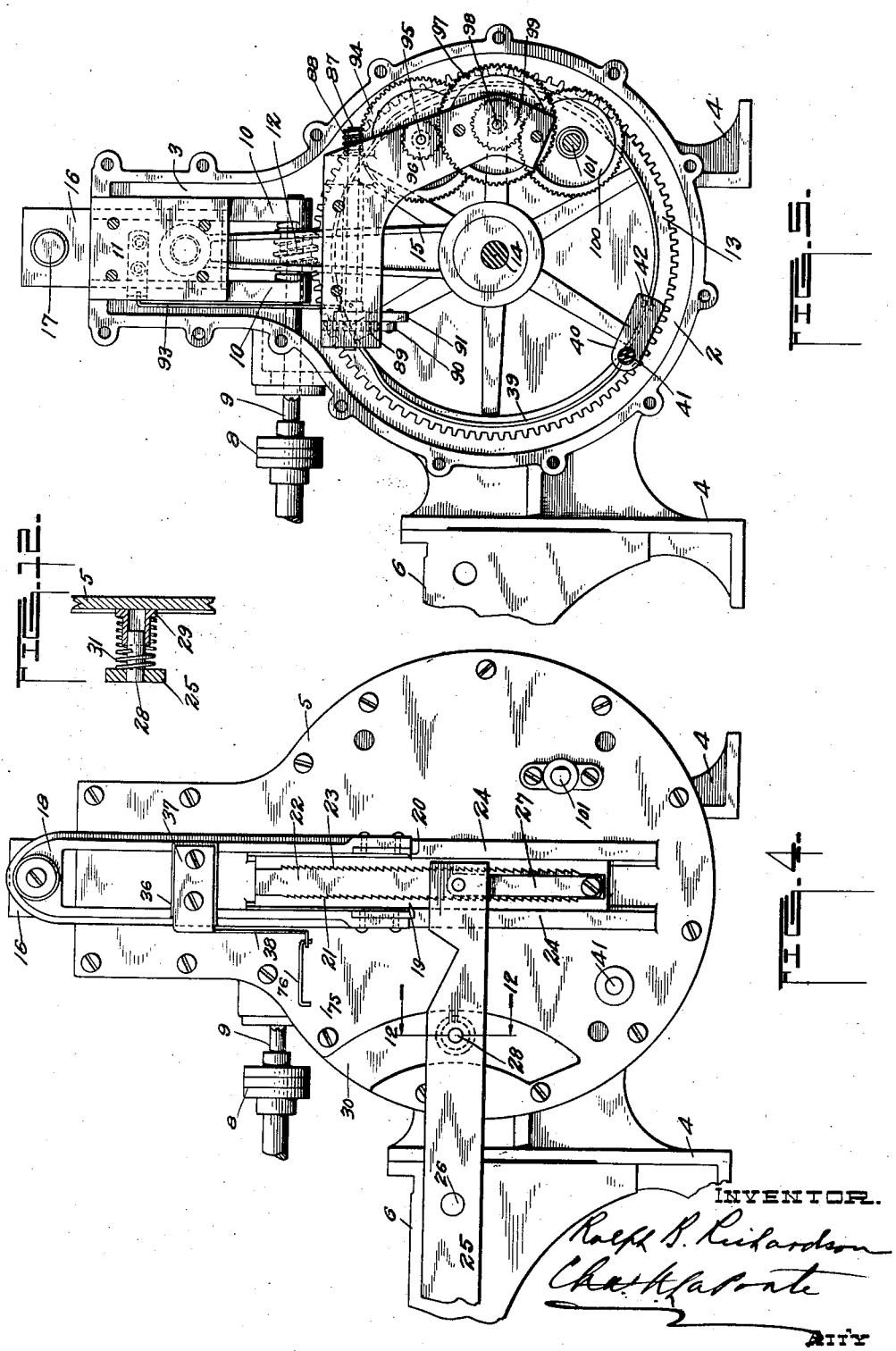
INVENTOR.
Ralph B. Richardson
Chas. K. Laponte
ATT'Y March 23, 1926.
R. B. RICHARDSON
TEMPERATURE REGULATOR OR THERMOSTAT
Filed August 13, 1923  5 Sheets-Sheet 4
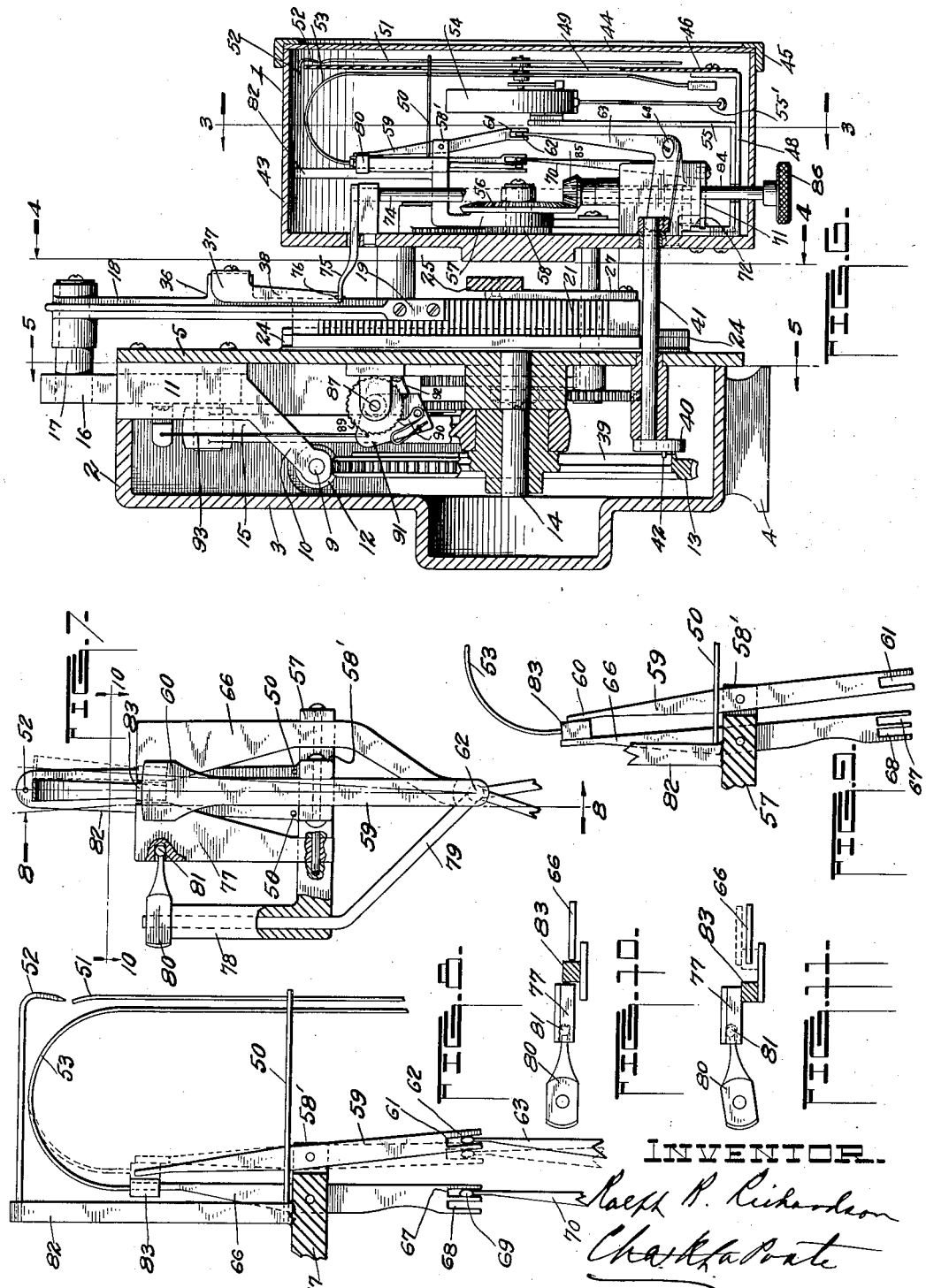

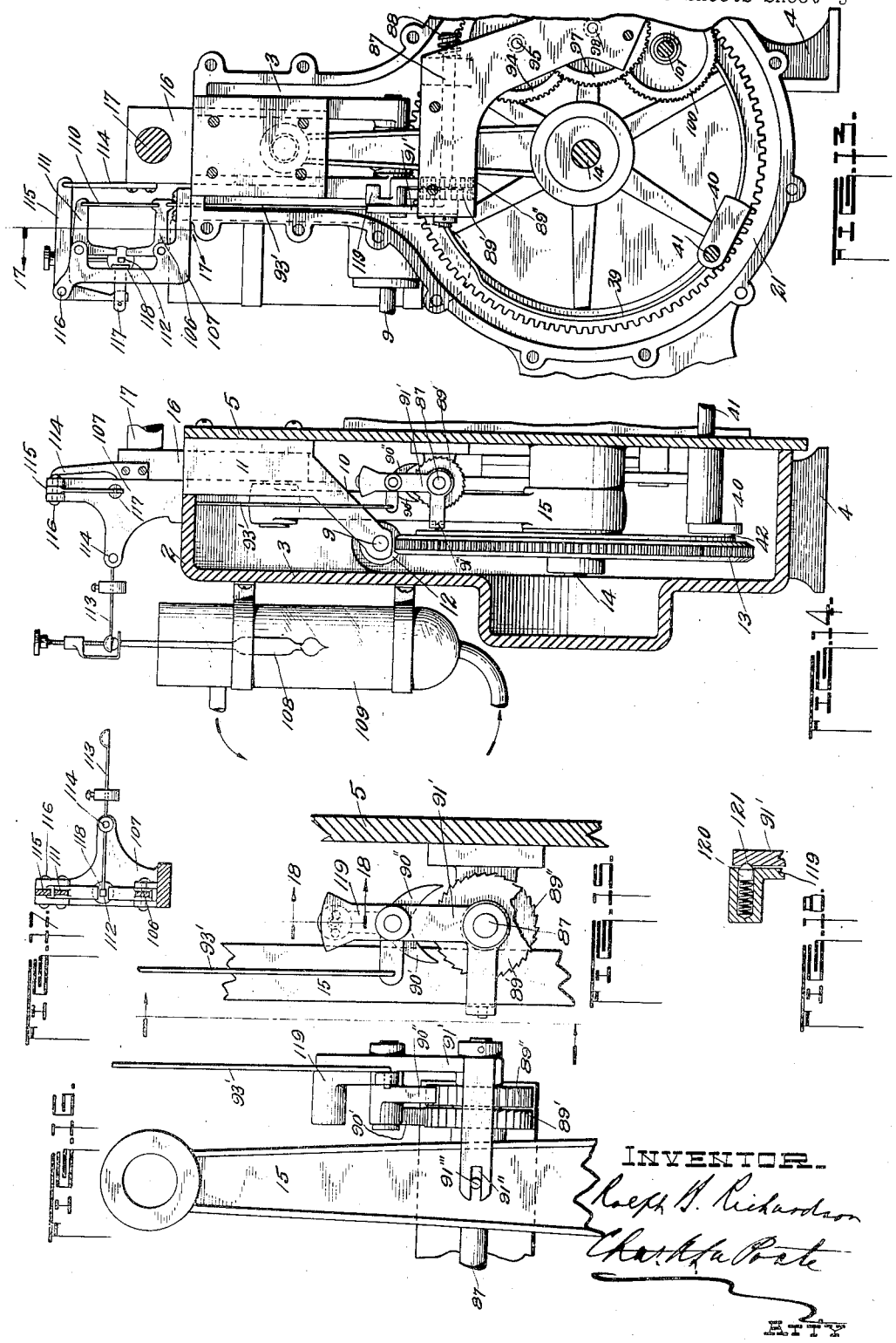

Patented Mar. 23, 1926.

1,578,208

UNITED STATES PATENT OFFICE.

RALPH B. RICHARDSON, OF NEW YORK, N. Y.

TEMPERATURE REGULATOR OR THERMOSTAT.

Application filed August 13, 1923. Serial No. 657,232.

*To all whom it may concern:*

Be it known that I, RALPH B. RICHARDSON, a citizen of the United States, a resident of New York, in the county of Richmond and State of New York, have invented new and useful Improvements in Temperature Regulators or Thermostats, of which the following is a specification.

This invention has reference to a temperature regulator or thermostat, adapted for controlling heat operations in rubber manufacturing plants, oil refineries, ammonia works, canning factories, steam plants, etc., in fact any process such as cooking, distillation, condensation, refrigeration and air or water heating.

The invention has for one of its objects to provide a temperature regulator or thermostat including a motor actuated mechanism arranged to operate a rheostat controlling an electric current, or a valve controlling a heating or cooling fluid, and also means subject to a change in temperature which controls the connection of the motor actuated mechanism with the rheostat or valves. The arrangement of the temperature sensitive means and the motor actuating mechanism, being such, that the resistance of the rheostat or valve is not thrown on the former but upon the latter, so that the work of operating the valves or the rheostat is thrown on the motor, leaving the sensitive parts unhindered and free to function in a sensitive manner.

This invention has for a further object to provide a temperature regulator or thermostat, including means for setting the regulator to a pre-determined temperature to which the process is to be held, and also means to automatically change the point to which it is desired to hold the temperature, for the reason that some processes require the temperature to be increased, diminished or otherwise changed during operation.

A further object of the invention is to provide in the regulator or thermostat means to automatically control the temperature of a process producing a liquid, according to the specific gravity or density of the products, for the reason that in some processes it is desired to produce a liquid of uniform specific gravity, which can only be done if the temperature of the process is varied automatically so as to accomplish this result.

In the accompanying drawings forming a part of this specification, and showing, for purposes of exemplification, a preferred form and manner in which the invention may be embodied and practised, but without limiting the claimed invention specifically to such illustrative instance or instances:—

Figure 1 is a front elevation or front face view of a temperature regulator or thermostat embodying my invention, showing it motor connected and in dotted lines the motor actuated valves or rheostat;

Figure 2 is a view somewhat similar to Figure 1, except that the glass panel or transparent front and the dial plate of the instrument case have been removed;

Figure 3 is a view somewhat similar to Figure 2, except that the pointer and Bourdon tube or gauge have been removed to expose to view parts therebehind, somewhat as the same would appear on the line 3—3 Figure 6 looking in the direction of the arrow;

Figure 4 is a front elevation of the casing housing the actuating mechanism and showing the means for operating the valves or rheostat from the motor, somewhat as the same would appear on the line 4—4 Figure 6 looking in the direction of the arrow;

Figure 5 is an elevation showing the interior of the case housing the actuating mechanism, its front plate being removed and as the same would appear on the line 5—5 Figure 6 looking in the direction of the arrow;

Figure 6 is a vertical sectional view through the regulator, somewhat as the same would appear on the line 6—6 Figure 2 looking in the direction of the arrow;

Figure 7 is an enlarged detail face view of certain controlling levers or arms within the instrument case;

Figure 8 is a side view of Figure 7, dotted lines showing movement of parts;

Figure 9 is a view similar to Figure 8, with certain parts omitted and illustrating movement of the parts shown;

Figure 10 is a top plan view of levers or arms shown in Figure 7, as the same would appear on the line 10—10 in said figure;

Figure 11 is a view similar to Figure 10 showing a different position the parts may be caused to assume;

Figure 12 is a detail sectional view, as the same would appear on the line 12—12 Figure 4;

Figure 13 is a front face view, partly broken away, showing the interior of the housing for the actuating mechanism and also the means to control the temperature of a product, according to the specific gravity or density of the product;

Figure 14 is a sectional view of the housing shown in Figure 13, somewhat similar to corresponding parts of Figure 6 with the means actuated by the change in specific gravity or density of the product;

Figure 15 is a detail in elevation of parts seen in Figure 14;

Figure 16 is a side elevation of the parts seen in Figure 15;

Figure 17 is a detail partly in section as the same would appear on the line 17—17 Figure 13, and Figure 18 is a detail sectional view as the same would appear on the line 18—18 Figure 15.

Like characters of reference denote corresponding parts throughout the figures.

The regulator or thermostat includes an instrument case 1 housing the temperature sensitive means, and an actuating mechanism case 2 housing and supporting the motor operated means for actuating the rheostat controlling an electric current or the valves controlling a heating or cooling fluid. The two said casings being removably attached and providing a support for operating connections between certain elements within the two said casings.

The housing 2 comprises the open face shell 3 having legs 4 to support the regulator, the shell being closed, preferably by the removable closure or plate 5 to which is attached and with which the gearing and other operating parts enclosed within the case 2 may be removed or replaced. To one of the legs 4 may be attached a bracket 6, see Figure 1, to support an electric motor 7 coupled by a preferably flexible connection 8 with a shaft 9 passing through a wall of the case 2 and journaled in arms 10, see Figures 5 and 6, depending from a support and guide 11 attached to the closure or plate 5. It may be well to state here that the shaft 9 is withdrawn to permit the closure or plate 5 to be removed with all the parts supported thereby, to which reference will be made. On the shaft 9 is a worm 12 meshing with and intended to constantly and continuously rotate a worm wheel 13, when the motor 7 is in operation. The worm wheel 13 is carried on a stub shaft 14 projecting inwardly from the closure or plate 5, and connected eccentrically with the hub of the wheel 13 is a connecting arm 15 which, at its upper end has a pivotal connection with a slide-block 16, slidable up and down in the support and guide 11 attached to the closure or plate 5. The block 16 protrudes from the shell 3 of the case 2 and carries a stud 17 to which is pivotally connected the depending bifurcated arm 18, and to the lower ends of the opposite bifurcated sections of the arm are connected toothed members 19 and 20, the former of which is arranged to have engagement with teeth 21 on a slide bar 22 to move said bar in one direction and the latter is arranged to have engagement with teeth 23 on said slide bar 22 to move said bar in an opposite direction. Said bar is movable in guides 24 on the outside face of the closure or plate 5, see Figures 4 and 6.

It will be apparent from the description thus far that when the motor 7 is running, motion is imparted to gearing 12 and 13, resulting in the actuation of the arm 15 and the guide block or head 16 and the reciprocation of the bifurcated arm 18, which is adapted to be oscillated on its pivot pin 17 in a manner to be described, to cause the tooth members 19 and 20 to alternately engage with the teeth on the slide bar 22 to move it up or down, as the case may be, to operate a valve or a rheostat. Such a valve is shown in dotted lines in Figure 1, and designated A, being arranged to control a heating or cooling fluid, and a rheostat is also shown in dotted lines in Figure 1, and designated B, being arranged to control an electric current. Neither the valve nor the rheostat forms any part of the present invention, and therefore are only diagrammatically illustrated, being shown merely to illustrate the practical workings of the regulator. However, connections are provided between the valve or the rheostat and the slide bar 22 whereby, when either of the toothed ends of the arm 18 are caused to be moved into engagement with the teeth on the slide bar 22, through the actuation of the temperature sensitive means within the instrument case 1, the power of the motor 7 is exerted on the bar 22, and the means operated thereby, to move the valve A or actuate the rheostat B. Such connections are best seen in Figures 1 and 4 and include a bar 25 pivoted at 26 to the bracket 6 and to the inner end of said bar is pivotally connected a link 27, in turn pivotally connected to the toothed bar 22. Serving to frictionally retard or hold the bar 25 and the bar 22, I provide a brake in the form of a pin 28 connected to the bar 25 and associated with a shoe 29 movable on the face of the closure or plate 5 and preferably within a seat or depression 30, a spring 31 between the bar 25 and the shoe 29 providing the tension for holding the bars 25 and 22 in working relation with the parts associated therewith. Slidably adjustable on the pivoted bar 25, is a block 32 which is arranged to be held by the set-screw 33, and to said block is connected a link 34 to which may be connected a rod 35 or equivalent means which in turn, may have suitable operative connection with the valve A or the rheostat B, in manner, as shown in Figure 1.

A bridge 36 connects the opposite extensions of the pivoted and reciprocal arm 18 and to said bridge is attached a plate 37 formed or provided with a depending spring finger 38 with which is connected means, to be described, within the instrument case 1 which is subject or sensitive to changes in temperature and arranged to oscillate said arm 18 to transmit the power of the motor through the connections described, to operate the valve A or the rheostat B.

The worm wheel 13 is provided with an annularly arranged cam ring 39, see Figures 5 and 6, adapted to impart slight oscillatory movement to a plate or crank 40 connected to the inner end of a rock shaft 41, the latter having a journal bearing on and passing through the closure or plate 5 of the case 2 and extending across and into the instrument case 1, see Figure 6. The crank or plate 40 has pins or rollers 42 lying on either side of the cam ring 39, see Figure 5 and as the worm gear 13 is revolved the pins or rollers 42 ride over the regular and irregular faces or portions of said cam ring and in doing so oscillate the crank or plate 40 and with it the rock shaft 41, the result of which is to impart movement to parts to be described housed within the instrument case 1, to which attention is now directed. As shown, the cam ring 39 is constructed to impart two oscillations to the plate 40 and shaft 41 with rotation of the worm wheel 13, but this may be increased or diminished, as may be deemed desirable.

The instrument case 1, like the case 2 comprises the open face shell 43 preferably covered by a glass or other transparent cover 44 held in place by the ring 45 clamped over the outer edge of the glass and onto the shell, as seen in Figure 6. Immediately in the rear of the glass or transparent cover 44 is placed a dial plate 46, on which appear suitable graduations 47, see Figure 1; said plate being supported on a bracket 48, and having a central opening 49 exposing to view certain elements therebehind and to receive preferably a pair of fingers or wire rods 50 which protrude through the opening 49 in the dial plate and lying on opposite sides of a pointer or index finger 51 located in front of the dial and adapted to move over the face of the dial and the graduations thereon, and said pointer co-acts with a marker 52 which overhangs the dial and is adapted to move over the graduations thereon. The fingers or rods 50 are preferably so spaced on either side of the pointer 51 as to permit of limited oscillation thereof, while at the same time the pointer, the fingers and the marker are capable of adjustment, by manual setting in relation to the graduations on the dial for setting the regulator to a predetermined temperature and also to be automatically moved to change the point at which it is desired to hold the temperature. In other words, the pointer may be automatically moved to cause the temperature to rise or fall, or dwell in any cycle over given periods with any desired rate of change.

The pointer 51 together with a curved needle 53 is connected with and adapted to be actuated by a Bourdon tube or gage 54, the latter being supported within the case 1 on a bracket 55 attached to the bracket 48. The Bourdon tube or gage is of well known construction and need not be further described, except to say that the arbor of the Bourdon tube or gage is the arbor for the pointer 51 as well as the needle 53 and such impulses as are imparted to the Bourdon tube or gage, due to temperature changes or pressure from whatever source, are transmitted to the pointer, which may move the distance between it and the fingers or rods 50, and also to the needle 53, which in turn, in a manner to be explained, controls the oscillation of the bifurcated arm 18 and will cause an engagement of either of the toothed members 19 or 20 with the toothed bar 22, the resulting action of which will impart movement from the motor 7, through the connections described, to the valve A or the rheostat B and thereby control and maintain desired temperature or pressure. Connected to the Bourdon tube or gage 54 is a pipe or tube 55' leading to the source of pressure for imparting to said Bourdon tube or gage the impulses which will cause the operation of the pointer 51 and the needle 52.

Journaled on the rear wall and inside of the shell 43 of case 1 is a bevel gear wheel 56 to which is connected a plate 57 and a gear wheel 58, see Figures 2, 3 and 6. It being here pointed out that the axis of the bevel gear wheel 56 and associated parts and the arbor of the Bourdon tube or gage supporting the pointer 51 and the needle 52 are in axial alignment.

The plate 57 rises above and extends forward over the bevel gear wheel 56, see Figure 6, and in a bifurcated end 58' of said forward extension is pivoted an upstanding arm 59, the upper end of which is preferably flattened and broadened, as at 60, while its lower end is slotted as at 61 in which is seated a ball or equivalent end 62 of a bell-crank shaped lever 63 pivoted at 64 to a support in the case 1, the rear end of said bell-crank lever being connected by a crank arm 65 with the end of the rock-shaft 41 extending into the case 1 and arranged to have rocking movement imparted thereto from the cam ring 39 on the worm wheel 13, in manner previously referred to. Pivoted to one side of the forward extension of the plate 57 is an upstanding arm 66, the upper end of which is flattened and spread and lies behind the upper end of the upstanding arm 59 while its lower end lies behind the lower end of said arm 59 and is provided with a pair of slots 67 and 68, in the former of which is seated a ball or equivalent end 69 of a lever 70, see Figure 3 to which is connected a crank 71 pivoted to a suitable support, and to said crank is connected a link 72, which in turn is connected to a crank 73 connected to the lower end of an upstanding rockable rod 74 journaled in suitable bearings, to the upper end of which is connected an arm 75 passing out through the rear wall of the shell 43 of case 1 and to which is connected a link 76, see Figures 3 and 4 which in turn is connected to the spring arm 38 of the plate 37 attached to the oscillatory arm 18 carrying the toothed members 19 and 20. Connected to the other side of the forward extension of the plate 57 are upstanding arms 77 and 78, the former being pivoted and somewhat like the arm 66, but minus the lower extended portion, its upper end flattened and spread and lies behind the upper end of the upstanding arm 59. Said spread and flattened upper ends of the arms 66 and 77 are suitably spaced apart, as shown in Figures 10 and 11 and normally lie in the same horizontal plane and are capable of being moved by the upstanding arm 59, through the action of the cam 39 in the actuating mechanism, as I shall explain. The arm 78 has a rockable rod 79 extending therethrough, its lower end extending toward the lower end of the arm 66 and provided with a ball or equivalent end seated in the other slot 68 in said arm, while to its upper protruding end is connected a crank 80 having a ball or equivalent end 81 seated in a recess in the side of the upper end of the arm 77. It will thus be apparent that when either of the arms 66 or 77 is oscillated or moved through the action of the upstanding arm 59 that movement will be imparted to the lever 70 and to the rockable rod 74, either through the connection provided between the arm 66 and the lever 70 or through the connection provided between the arm 77, the rocking rod 79, the arm 66 and the lever 70. It is well to state here that the connection between the bell-crank shaped lever 63 and the upstanding arm 59 and between the lever 70 and the arm 66 and between the rod 79 and said arm 66 are in axial alignment with the axis of the bevel gear wheel 56 and the arbor of the Bourdon tube or gage and the pointer 51 and needle 53.

Before describing the needle 53 and its relation to the arms 66 and 77 and the upstanding arm 59 it is well to state that the marker 52 is connected to an upwardly extending arm 82 from the forward extension of the plate 57, and the fingers or rods 50 lying on opposite sides of the needle 53 and the pointer 51 are connected to and extend forwardly from the upwardly extending arm 82, see Figures 6 and 7.

The needle 53 is counter-balanced at its lower end, see Figure 6, and its upper end is curved rearwardly and downwardly and has connected thereto a block 83 which normally lies in front of the space between the upper ends of the arms 66 and 67 or swung to either side and in front of said arms 66 and 77, as shown in full lines in Figure 10 and in full and dotted lines in Figure 11. When the desired temperature is being maintained, the block 83 lies in front of the space between the arms 66 and 77 and the moving to and fro of the upper end of the arm 59, caused by the rotation of the worm wheel 13 and the cam 39 thereon is ineffective, except to move the block between the arms 66 and 77, see Figure 10, but should the temperature vary, such as to cause an impulse to be imparted which would result in the operation of the Bourdon tube or gage and the oscillation of the pointer 51 and the needle 53, the block 83 will be moved to one side or the other, as shown in full and dotted lines in Figure 11 and in front of one or the other of the arms 66 or 77; then as the upper end of the arm 59 moves inwardly, it will be apparent that it will engage with said block 83 and it being in front of and bearing against one of said arms, the arm will be caused to be oscillated and through its connection with the lever 70 and it in turn with the rocking rod 74 will oscillate the latter and impart oscillatory movement to the arm 18 and cause an engagement of a toothed member 19 or 20 with the toothed bar 22 and through the action of the motor impart the power to the valve A or the rheostat B to actuate the same to restore the temperature to the desired degree. It is apparent, therefore, that the regulator is very sensitive and at the same time powerful enough that it will operate a valve controlling a heating or cooling fluid, or a rheostat controlling an electric current, and in such a way that the resistance of the valve or the rheostat is not thrown on the sensitive elements in the instrument case, but upon the motor, so that the work is done by the source of power, the motor, leaving the sensitive parts in the instrument case free to function in a sensitive manner.

The mechanism within the instrument case 1, including the needle 53, marker 52, pointer 51, and the operating means for the pivoted arm 18, such as the arms 59, 66 and 77 and support therefor are manually adjustable within said case for setting the pointer 51 to a pre-determined temperature to which a process is to be held, and comprehends a shaft 84 passing up through the bottom of the shell 43, on the upper end of which is carried a bevel pinion 85 meshing with the bevel gear wheel 56 and on the lower protruding end of said shaft a finger-hold 86. Looking at Figure 6 it will be seen that upon turning the shaft 84, the bevel gear wheel 56 and plate 57 will be turned and with the plate 57 the arms 59, 66 and 77 carried thereby, which will move about the ball heads connecting the arm 59 with the lever 63 and the arms 66 and 77 with the lever 70, such connections, as described, being in axial alignment with the axis of the bevel gear wheel 56; also the needle 53 and the pointer 51 will be moved and set in proper relation to the parts described and associated therewith, through and by means of the fingers or rods 50 lying on opposite sides of said pointer and needle and which are moved by the plate 57 to which they are connected. And when the parts are so adjusted for maintaining a pre-determined temperature, when such temperature varies, if it does, the pointer and needle are moved by the impulses imparted through the Bourdon tube or gage and the arms 66 or 77 moved through the action of the arm 59 engaging with the block 83 on the needle to impart movement through the connections described to the arm 18 for imparting movement from the prime mover to open or close the valve A or actuate the rheostat B.

Some processes require the temperature to be increased, diminished or otherwise changed during operation, and I have therefore provided means in the regulator to automatically change the point to which it is desired to hold the temperature, or that will cause the temperature to rise or fall, or dwell in any cycle over any period with any desired rate of change, which cycle, must of course be pre-determined.

Within the case 2 and on the plate 5 is journaled a shaft 87, on one end of which is carried a worm 88 and on its opposite end is carried a ratchet wheel 89, see Figures 5 and 6. The ratchet wheel is operated by a ratchet pawl 90, spring held, and carried by a plate 91 hung on the shaft 87, the ratchet wheel being held against movement in one direction by a pawl 92 attached to the plate 5. To said plate 91 is connected a rod 93, also connected to the slidable block 16, so that as the latter is reciprocated by the motor 7 and its connections, the plate 91 is oscillated and a partial rotation imparted to the shaft 87. The worm 88 meshes with and imparts a partial revolution to a worm wheel 94 which is carried by a short shaft 95 having a pinion 96 meshing with a gear wheel 97 on a short shaft 98, and said shaft has a pinion 99 meshing with a gear wheel 100 on a cam shaft 101 carrying a cam 102. This cam is one of many which may be employed, each being designed to accomplish the particular changes desired in temperature and to cover the various periods in which it is desired to maintain certain pre-determined temperatures or changes in temperatures. Riding on this cam is a roller 103 carried by an arm 104, slotted as at 105, to receive one end of the shaft 101 and to move thereacross under the tension of a spring 105 which acts to hold the roller 103 in contact with the surface of the cam. Said arm 104 is connected to a toothed segment 105 journaled on the rear wall of the shell 43 and within the case 1 and meshes with the gear wheel 58, previously referred to connected with the hand setting gear 56 and the plate 57, see Figure 6.

The gearing shown and last described in the case 2, for rotating the cam 102 may rotate said cam once in every twenty-four hours, or any other pre-determined period according to the reduction gears operating the same from the shaft 87, as will be understood, and by changing cams which may be designed accordingly.

The drawings thus far described, illustrate the regulator or thermostat arranged for automatically changing the point to which it is desired to hold the temperature, or that will cause the temperature to rise or fall, or dwell in any cycle over any period with any desired rate of change. When it is desired to set the regulator to a pre-determined temperature to which the process is to be held, the cam 102 is removed and with it the arm 104 and roller 103 and the spring 105, making ineffective the gearing described for operating the cam through the cam shaft 101.

To employ the regulator or thermostat to control temperature according to the specific gravity or density of the product the ratchet wheel 89 on the shaft 87, with its associated parts, including the rod 93 would be removed, and substituted in lieu thereof the pair of ratchet wheels 89' and 89" having oppositely placed ratchet teeth, see Figures 14 and 15. Also to the shaft 87, in place of the plate 91 there is substituted an angular arm or plate 91', one portion of which rises up from the shaft 87 and has connected thereto ratchet pawls 90' and 90" to engage and operate the respective ratchet wheels 89' and 89". The other portion of the arm or plate 91' extends across and behind the arm 15 and is slotted at 91" which embraces a pin 91''' on the arm 15, whereby as the arm 15 moves up and down the plate 91' will be oscillated; other means, which I will describe, being employed to move the ratchet pawls 90' and 90" into or out of engagement with the respective ratchet wheels 89' and 89", so that as the plate 91' is oscillated movement may be imparted to the cam shaft 101 for increasing or decreasing the temperature, by the means and in the manner hereinbefore described, according to the specific gravity or density of the product.

The ratchet wheel 89 previously described, is arranged to operate the shaft 87 and gearing and cam shaft 101 in one direction only; whereas the ratchet wheels 89' and 89'' may be caused to alternately operate the shaft 87 and gearing and cam shaft 101 first in one direction, then in an opposite direction, as the specific gravity or density of the product changes. It being understood that the block 83 on the needle 53 is movable with and through the impulses in the Bourbon tube, whereby the valve A or rheostat B may be actuated, in manner explained, and that if for any reason there is a change in the specific gravity or density of the liquid produced, even though the pointer 51 indicates a proper temperature and the needle 53 is not affected, the means I am about to describe, will be actuated through a change in the specific gravity of the product and cause oscillation of the plate 57 in one direction or the other to move the alternate arms 66 and 77 whereby the arm 59 during oscillation will engage the needle block 83 and transmit movement to the toothed bar 22 by the means and in the manner described to open or close valve A or actuate the rheostat B.

The ratchet pawls 89' and 89'' have connected thereto a rod 93' similar to the rod 93, which actuates the said pawls to cause them to alternately engage the respective ratchet wheels 89' and 89'', but instead of being operated from the slide-block 16, is connected to a bell-crank lever 106 pivoted to a bracket 107 attached to the upper end of the housing 2, see Figures 13 and 14, which is adapted to be actuated by the movement of a float 108 arranged to rise and fall according to the specific gravity or density of a fluid in a container 109, secured to the outside of the rear wall of the housing 2. Connected also to the same end of the bell-crank lever 106, as the rod 93', is a short rod or link 110 which in turn, is connected to a bell-crank lever 111, similar to the lever 106, but inverted in respect thereof, see Figure 13. The opposite ends of the levers 106 and 111 approach each other and lie with a space therebetween in which may move, back and forth, under normal working conditions, a block 112, see Figures 13 and 17, which is connected to the free end of a balanced arm or lever 113 fulcrumed at 114 to the bracket 107; said arm or lever 113 being adjustably connected to be operated by the float 108. To the slide block 106, to which the rod 93, previously referred to and described is connected, there is connected an arm 114, which at one end is connected to a bell-crank lever 115 fulcrumed at 116 to the bracket 107 with one end connected to a push bar 117 having a head 118 adapted, under certain working conditions to engage the block 112 and move it in the open space between the ends of levers 106 and 111, but under certain other working conditions to engage the block 112, when in front of the lever 106 or the lever 111 to oscillate the same and move the rod 93' down or up, resulting in the operation of the shaft 87 through the ratchet wheels 89' and 89'' and the ratchet pawls 90' and 90''. The block 112 functions like the block 83 on the needle 53, and the push bar 117 functions like the arm 59. The ratchet pawls 90' and 90'' are connected to an arm 119 provided with a spring held detent 120 engageable in depressions 121 in the plate 91' to temporarily hold the pawls 90' and 90'' positioned to engage and operate a ratchet wheel.

From the foregoing description it should be apparent that when the specific gravity of the liquid in the container 109 changes one of the pawls 90' or 90'' will engage with a ratchet wheel and with each reciprocation of the slide block 16 from the motor, motion will be imparted to the shaft 87 through the power imparted from the motor through said shaft to the cam shaft 101 in manner and for the purposes previously explained. It should be further apparent that my regulator or thermostat has many and various uses and is capable of modification in such uses, so that I do not wish to be limited to the precise construction shown or to the details thereof, except as may be specifically limited by the appended claims.

What I claim is:—

1. In a temperature regulator or thermostat, in combination, a reading dial, a pointer associated therewith, means capable of manually setting said pointer and other means adapted to automatically change the position of said pointer, said automatic means being removable and said manual setting means being operative on the removal of said automatic means a prime mover, mechanism arranged to be actuated by said prime mover to operate a valve means or rheostat, means to place the prime mover in operative relation with said mechanism, a Bourdon tube or gage, means movable under the impulses of said tube or gage, and means operated by the prime mover to actuate said last mentioned means for operatively connecting said first mentioned mechanism in operative relation with said prime mover.

2. In a temperature regulator or thermostat, in combination, a reading dial, a pointer associated therewith, a prime mover, mechanism arranged to be actuated by said prime mover to operate a valve means or rheostat, a Bourdon tube or gage, means movable under the impulses of said tube or gage, means operated by the prime mover to actuate said last mentioned means for operatively connecting said first mentioned mechanism in operative relation with said prime mover, a liquid container, and means operated by and according to the specific gravity or density of the liquid in said container for connecting the prime mover in operative relation with said means movable under the impulses of the Bourdon tube or gage, independently of the latter.

3. In a temperature regulator or thermostat, in combination, a reading dial, a pointer associated therewith, a Bourdon tube or gage, a needle sensitive to the impulses of said tube or gage, a prime mover, means movable by the prime mover to engage and actuate said needle, mechanism arranged to be actuated by said prime mover to operate a valve means or rheostat, and means arranged to be actuated by and through the movement of said needle, as changes in temperature occur, to operatively connect said mechanism with said prime mover.

4. In a temperature regulator or thermostat, in combination, a reading dial, a pointer associated therewith, a Bourdon tube or gage, a needle sensitive to the impulses of said tube or gage, a prime mover, mechanism arranged to be actuated by said prime mover to operate a valve means or rheostat, means to connect said mechanism in operative relation with said prime mover, a controlling means, means operated by the prime mover to actuate the needle and through it the controlling means to connect the mechanism in operative relation with said prime mover, and a common means to move the pointer, needle and controlling means in their relation to said dial.

5. In a temperature regulator or thermostat, in combination, a reading dial, a pointer associated therewith, a Bourdon tube or gage, a needle sensitive to the impulses of said gage or tube, a prime mover, mechanism arranged to be actuated by said prime mover for operating a valve means or rheostat, a controlling means, means arranged to be operated by the controlling means to operatively connect said mechanism with said prime mover, means operated by the prime mover adapted to operate the needle and cause it to engage and operate said controlling means, a liquid container, and means operated by and according to the specific gravity of the liquid adapted to connect the prime mover with said controlling means, thereby the latter is set in operative relation with said needle.

6. In a temperature regulator or thermostat, in combination, a reading dial, a pointer associated therewith, a Bourdon tube or gage, a needle sensitive to the impulses of said tube or gage, a controlling means, a prime mover, mechanism arranged to be actuated by the prime mover for operating a valve means or rheostat, means operated by the controlling means to connect said mechanism with said prime mover, means operated by the prime mover to engage said needle and through it operate said controlling means, and manually operable means for setting said pointer and with it said needle and controlling means in relation to said dial.

7. In a temperature regulator or thermostat, in combination, a reading dial, a pointer associated therewith, a Bourdon tube or gage, a needle sensitive to the impulses of said tube or gage, a controlling means, a prime mover, mechanism arranged to be actuated by the prime mover for operating a valve means or rheostat, means operated by the controlling means to connect said mechanism with said prime mover, means operated by the prime mover to engage said needle and through it operate said controlling means, and means in operative connection with said prime mover, and controlling means, pointer and needle for automatically changing the position thereof in relation to said dial.

8. In a temperature regulator or thermostat, in combination, a reading dial, a pointer associated therewith, a Bourdon tube or gage, a needle sensitive to the impulses of said tube or gage, a controlling means, a prime mover, mechanism arranged to be actuated by the prime mover for operating a valve means or rheostat, means operated by the controlling means to connect said mechanism with said prime mover, means operated by the prime mover to engage said needle and through it operate said controlling means, means in operative connection with said prime mover, and controlling means, pointer and needle for automatically changing the position thereof in relation to said dial, and regulating means in said last mentioned connections for determining the extent of movement of said pointer and associated parts and the points of retardation thereof.

9. In a temperature regulator or thermostat, in combination, a reading dial, a pointer associated therewith, a Bourdon tube or gage, a needle sensitive to the impulses of said tube or gage, a controlling means, a prime mover, mechanism arranged to be actuated by the prime mover for operating a valve means or rheostat, means operated by the controlling means to connect said mechanism with said prime mover, means operated by the prime mover to engage said needle and through it operate said controlling means, a liquid container, a float therein and movable according to the specific gravity or density of the liquid, means operable by the prime mover for positioning the controlling means in relation to said needle, and means arranged to be actuated by said float for operatively connecting the controller positioning means with said prime mover.

10. In a temperature regulator or thermostat, in combination, a temperature sensitive means, a casing housing the same, an actuating mechanism, a casing containing the same, a prime mover, operating connections between said prime mover and said mechanism, said temperature sensitive means including a Bourdon tube, a needle sensitive to the impulses of said tube and a controlling means arranged to be operated by said needle, means operable by the prime mover for actuating a valve means or rheostat, means actuated by the controlling means to connect said valve or rheostat actuating means with said prime mover, and means operated by the prime mover to engage said needle and cause it to operate said controlling means.

In witness whereof, I have hereunto affixed my hand and seal this ninth day of August, 1923.

RALPH B. RICHARDSON.